(12) United States Patent
Cherian et al.

(10) Patent No.: US 7,306,637 B2
(45) Date of Patent: *Dec. 11, 2007

(54) ANIONIC ABRASIVE PARTICLES TREATED WITH POSITIVELY CHARGED POLYELECTROLYTES FOR CMP

(75) Inventors: Isaac K Cherian, Aurora, IL (US); Phillip Carter, Naperville, IL (US); Jeffrey P. Chamberlain, Aurora, IL (US); Kevin Moeggenborg, Naperville, IL (US); David W. Boldridge, Oswego, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 261 days.

This patent is subject to a terminal disclaimer.

(21) Appl. No.: 10/855,276

(22) Filed: May 27, 2004

(65) Prior Publication Data

US 2004/0229552 A1    Nov. 18, 2004

Related U.S. Application Data

(63) Continuation of application No. 10/073,844, filed on Feb. 11, 2002, now Pat. No. 6,776,810.

(51) Int. Cl.
*C09G 1/02* (2006.01)
*C09G 1/04* (2006.01)
*B24B 1/00* (2006.01)

(52) U.S. Cl. ............................ 51/307; 51/308; 51/309; 106/3; 438/692; 438/693; 216/99; 216/100; 216/101; 216/102; 216/105

(58) Field of Classification Search .......... 51/307–309; 106/3; 438/692, 693; 216/99, 101, 102, 216/105, 96, 100; 451/28
See application file for complete search history.

(56) References Cited

U.S. PATENT DOCUMENTS

| | | |
|---|---|---|
| 4,752,628 A | 6/1988 | Payne |
| 4,867,757 A | 9/1989 | Payne |
| 5,123,958 A | 6/1992 | Wiand |
| 5,352,277 A | 10/1994 | Sasaki |
| 5,489,233 A | 2/1996 | Cook et al. |
| 5,527,423 A | 6/1996 | Neville et al. |
| 5,709,588 A | 1/1998 | Muroyama |
| 5,860,848 A | 1/1999 | Loncki et al. |
| 5,876,490 A | 3/1999 | Ronay |
| 5,958,794 A | 9/1999 | Bruxvoort et al. |
| 5,968,280 A | 10/1999 | Ronay |
| 6,099,604 A | 8/2000 | Sandhu et al. |
| 6,117,220 A | 9/2000 | Kodama et al. |
| 6,117,775 A | 9/2000 | Kondo et al. |
| 6,117,783 A | 9/2000 | Small et al. |
| 6,132,637 A | 10/2000 | Hosali et al. |
| 6,171,352 B1 | 1/2001 | Lee et al. |
| 6,303,049 B1 | 10/2001 | Lee et al. |
| 6,348,076 B1 * | 2/2002 | Canaperi et al. .............. 51/309 |
| 6,776,810 B1 * | 8/2004 | Cherian et al. ............... 51/307 |
| 6,824,579 B2 * | 11/2004 | Ronay .......................... 51/307 |
| 2002/0052173 A1 * | 5/2002 | Andreas ...................... 451/41 |
| 2003/0139116 A1 * | 7/2003 | Moeggenborg et al. ....... 451/28 |

FOREIGN PATENT DOCUMENTS

| | | |
|---|---|---|
| EP | 1 036 836 A1 | 9/2000 |
| EP | 1 104 778 A2 | 6/2001 |
| EP | 1 118 647 A1 | 7/2001 |
| JP | 64-87146 A | 3/1989 |
| JP | 2000-164631 A | 6/2000 |
| WO | WO 99/64527 A1 | 12/1999 |
| WO | WO 01/02134 A1 | 1/2001 |
| WO | WO 01/12740 A1 | 2/2001 |
| WO | WO 01/14496 A1 | 3/2001 |
| WO | WO 01/19935 A1 | 3/2001 |

OTHER PUBLICATIONS

McNamee et al., *Colloids and Surfaces, A: Physicochemical and Engineering Aspects*, 193, 175-185 (2001).
Schwarz et al., *Colloids and Surfaces, A: Physicochemical and Engineering Aspects*, 140(1-3), 377-384 (1998).
Schwarz, S. et al. *Colloids and Surfaces, A: Physicochemical and Engineering Aspecs*, 163(1), 17-27 (2000).

* cited by examiner

*Primary Examiner*—Michael Marcheschi
(74) *Attorney, Agent, or Firm*—Thomas Omholt; Francis Koszyk

(57) ABSTRACT

The invention provides chemical-mechanical polishing systems, and methods of polishing a substrate using the polishing systems, comprising (a) an abrasive, (b) a liquid carrier, and (c) a positively charged polyelectrolyte with a molecular weight of about 15,000 or more, wherein the abrasive comprises particles that are electrostatically associated with the positively charged polyelectrolyte.

18 Claims, No Drawings

ANIONIC ABRASIVE PARTICLES TREATED WITH POSITIVELY CHARGED POLYELECTROLYTES FOR CMP

CROSS-REFERENCE TO RELATED APPLICATIONS

This patent application is a continuation of U.S. patent application Ser. No. 10/073,844, filed on Feb. 11, 2002, now U.S. Pat. No. 6,776,810.

FIELD OF THE INVENTION

This invention pertains to polishing compositions containing polyelectrolyte-coated abrasives and methods for their use in chemical-mechanical polishing.

BACKGROUND OF THE INVENTION

Compositions and methods for planarizing or polishing the surface of a substrate are well known in the art. Polishing compositions (also known as polishing slurries) typically contain an abrasive material in an aqueous solution and are applied to a surface by contacting the surface with a polishing pad saturated with the polishing composition. Typical abrasive materials include silicon dioxide, cerium oxide, aluminum oxide, zirconium oxide, and tin oxide. U.S. Pat. No. 5,527,423, for example, describes a method for chemically-mechanically polishing a metal layer by contacting the surface with a polishing slurry comprising high purity fine metal oxide particles in an aqueous medium. Alternatively, the abrasive material may be incorporated into the polishing pad. U.S. Pat. No. 5,489,233 discloses the use of polishing pads having a surface texture or pattern, and U.S. Pat. No. 5,958,794 discloses a fixed abrasive polishing pad.

Conventional polishing systems and polishing methods typically are not entirely satisfactory at planarizing semiconductor wafers. In particular, polishing compositions and polishing pads can have less than desirable polishing rates, arid their use in chemically-mechanically polishing semiconductor surfaces can result in poor surface quality. Because the performance of a semiconductor wafer is directly associated with the planarity of its surface, it is crucial to use a polishing composition and method that results in a high polishing efficiency, uniformity, and removal rate and leaves a high quality polish with minimal surface defects.

The difficulty in creating an effective polishing system for semiconductor wafers stems from the complexity of the semiconductor wafer. Semiconductor wafers are typically composed of a substrate, on which a plurality of transistors has been formed. Integrated circuits are chemically and physically connected into a substrate by patterning regions in the substrate and layers on the substrate. To produce an operable semiconductor wafer and to maximize the yield, performance, and reliability of the wafer, it is desirable to polish select surfaces of the wafer without adversely affecting underlying structures or topography. In fact, various problems in semiconductor fabrication can occur if the process steps are not performed on wafer surfaces that are adequately planarized.

The use of polyelectrolytes in chemical-mechanical polishing compositions is commonly known in the art. In some cases, the polyelectrolytes are used as complexing agents for the surface layer to be removed. In other cases, the polyelectrolyte is added to modify the properties of the polishing composition by acting as a dispersant, a thickener, or a flocculating agent. And still, in yet other cases, the polyelectrolyte is used to modify the surface of the abrasive particle.

The following patents and patent applications disclose polishing compositions comprising polyelectrolytes that purportedly complex the surface of the substrate. U.S. Pat. No. 6,099,604 discloses a polishing composition comprising a solvent, abrasive particles, and a polycarboxylic acid chelating agent. The chelating agent purportedly stabilizes portions of the substrate that are dislodged by the chemical-mechanical polishing process. WO 99/64527 discloses a polishing composition comprising water, an abrasive, an oxidizer, optionally a complexing agent and/or a dispersant, and an organic polymer to attenuate removal of an oxide film. WO 01/14496 discloses a polishing composition comprising an organic polymer with a backbone containing at least 16 carbons, and optionally abrasive particles, dispersing agents that prevent agglomeration of the abrasive particles, oxidizing agents, and complexing agents. The organic polymer is designed to adhere to the surface of a polished wafer, thereby eliminating scratching and redeposition of residue. U.S. Pat. No. 6,117,775 discloses a polishing composition comprising less than 1 wt. % abrasive particles, oxidizing agents, organic acids, and surfactants which purportedly suppress etching and oxidation. U.S. Pat. No. 6,303,049 discloses a polishing composition comprising an abrasive, an abrasion enhancer (e.g., phosphorous acid), and a water-soluble anionic chemical (e.g., a acrylate, phosphate, sulfate, or sulfonate-containing compound, polymer, and/or copolymer). The anionic chemical purportedly coats the surface of the metal film during polishing.

The following patents and patent applications disclose polishing compositions comprising polyelectrolytes that purportedly act to modify the properties of the polishing compositions. U.S. Pat. No. 4,752,628 discloses a polishing composition consisting of finely divided inorganic abrasive, a biocide, carboxylic acid dispersant polymer, carboxylic acid polymer thickener, corrosion inhibitor, and optionally a lubricant. U.S. Pat. No. 4,867,757 discloses a polishing composition with a pH greater than 8.5 consisting of finely divided inorganic abrasive, carboxylic acid dispersant polymer, and a lubricant. U.S. Pat. No. 5,123,958 discloses a polishing composition comprising an abrasive, a gel-type carrier comprising a polyvinyl alcohol and water mixture, and optionally a polyelectrolyte flocculating agent. U.S. Pat. No. 5,352,277 discloses a polishing composition comprising water, colloidal silica, a water-soluble polymeric compound, and a water-soluble salt at alkaline pH. The polymeric compound purportedly aids in forming a regular laminar flow between the polishing pad and the substrate surface during polishing. U.S. Pat. No. 5,860,848 discloses a polishing composition comprising water, submicron silica particles, a salt, an amine compound, and a polyelectrolyte at pH 8-11. The polyelectrolyte purportedly reduces particle adhesion to the substrate surface. U.S. Pat. No. 6,117,220 discloses a polishing composition comprising water, polystyrenesulfonic acid, an inorganic or organic acid, and an abrasive. The polystyrenesulfonic acid purportedly functions to flocculate the abrasive particles, producing a polishing composition with good anti-foaming properties and low incidence of surface pitting during chemical-mechanical polishing. U.S. Pat. No. 6,117,783 discloses a polishing composition comprising a hydroxylamine compound and sufficient polyelectrolyte to repel particles away from each other and the surface of the substrate. U.S. Pat. No. 6,132,637 discloses a polishing composition comprising an aqueous medium, an abrasive, a surfactant, an organic polymer, and a complexing agent with two or more acid groups capable of complexing silica and silicon nitride. The organic polymer purportedly acts to enhance the viscosity of the polishing composition and to inhibit scratching of the substrate being polished with the polishing composition. U.S. Pat. No. 6,171,352 discloses a polishing composition comprising an aqueous medium, abrasive, an abrasion accelerator, and optionally a nitrate salt or anionic surfactant (e.g., polycarboxylic acid) that reduces the viscosity of the polishing composition. JP 1087146 discloses a polishing composition comprising an abrasive and polystyrene sulfonic acid, which purportedly is used as a dispersant and improves polishing performance.

The following patents and patent applications disclose polishing compositions comprising abrasive particles that purportedly electrostatically interact with the polyelectrolyte. U.S. Pat. No. 5,876,490 discloses a polishing composition comprising abrasive particles and a polyelectrolyte (molecular weight of 500 to 10,000) with a charge that differs from that of the abrasive particles. The polyelectrolyte purportedly coats the surface of the abrasive particles leading to improved polishing behavior. EP 1 036 836 A1 discloses a polishing composition comprising an aqueous dispersion of polymer particles of thermoplastic resins and inorganic particles that have opposite zeta potentials and are bonded by electrostatic force. Similarly, EP 1 104 778 A2 discloses a polishing composition comprising composite particles consisting of inorganic particles and polymer particles of opposite zeta potential. EP 1 118 647 A1 discloses a polishing composition comprising an abrasive, an oxidizer, a co-oxidizer, and an anti-coagulation agent. The anti-coagulation agent is purportedly used to stabilize colloidal particles. No range for molecular weight is described for the anti-coagulation agent. JP 200164631 discloses a polishing composition comprising abrasives and a polymer or copolymer comprising sulfonic acid groups (MW of about 5,000 to about 20,000). The polymer purportedly adheres to the polishing waste created during chemical mechanical polishing. WO 01/02134 discloses a polishing composition comprising an aqueous medium and abrasive particles that are maintained in a meta-stable phase by the presence of ionic species (e.g., polyelectrolytes and surfactants) that coat the surface of the abrasive particles.

A need remains, however, for polishing systems and polishing methods that will exhibit desirable planarization efficiency, uniformity, and removal rate during the polishing and planarization of substrates, while minimizing defectivity, such as surface imperfections and damage to underlying structures and topography during polishing and planarization.

The invention seeks to provide such a chemical-mechanical polishing system and method. These and other advantages of the invention will be apparent from the description of the invention provided herein.

BRIEF SUMMARY OF THE INVENTION

The invention provides chemical-mechanical polishing ("CMP") systems comprising (a) an abrasive, (b) a liquid carrier, and (c) a positively charged polyelectrolyte with a molecular weight of about 15,000 or more, wherein the abrasive comprises particles that are electrostatically associated with the positively charged polyelectrolyte. The invention further provides a method of polishing a substrate using the chemical-mechanical polishing systems.

DETAILED DESCRIPTION OF THE INVENTION

The invention is directed to chemical-mechanical polishing ("CMP") systems comprising an abrasive, a liquid carrier, and a positively charged polyelectrolyte. The positively charged polyelectrolyte has a molecular weight of about 15,000 or more. The abrasive comprises particles that are electrostatically associated with the positively charged polyelectrolyte.

The CMP system typically will further comprise a polishing pad. The abrasive particles can be any suitable particles and can be fixed on the polishing pad and/or can be in particulate form and suspended in the liquid carrier. The polishing pad can be any suitable polishing pad. The abrasive (when present and suspended in the liquid carrier) and positively charged polyelectrolyte(s), as well as any other components suspended in the liquid carrier, form the polishing composition of the CMP system.

The positively charged polyelectrolyte and the abrasive particles associate electrostatically such that at least a portion of the particle surface is coated by the polyelectrolyte. The polyelectrolyte is positively charged and associates with airy abrasive particle that has a suitable zeta potential at the pH of the CMP system. The zeta potential of an abrasive particle refers to the difference between the electrical charge of the ions surrounding the abrasive particle and the electrical charge of the bulk solution (e.g., the liquid carrier and any other components dissolved therein). The zeta potential of the abrasive particles will vary with pH. The abrasive particles preferably have a negative zeta potential at the pH of the CMP system. In some cases, the abrasive particles having a negative zeta potential are obtained by treating an abrasive particle having a positive zeta potential with a charge-reversing agent before exposure to the positively charged polyelectrolyte. The charge-reversing agent typically is an inorganic acid, an organic acid, or a salt thereof. For example, the charge-reversing agent can be tartaric acid.

The abrasive particles can be any suitable abrasive particles, for example the abrasive particles can be natural or synthetic and can comprise diamond (e.g., polycrystalline diamond), garnet, glass, carborundum, metal oxide, carbide, nitride, and the like. Typically, the abrasive particles are selected from the group consisting of silica, alumina, titania, zirconia, ceria, germania, magnesia, silicon nitride, silicon carbide, boron carbide, titanium carbide, titanium diboride, tungsten carbide, diamond, co-formed products thereof, and combinations thereof. Preferably, the abrasive particles comprise silica or alumina.

The positively charged polyelectrolyte can be any suitable positively charged polyelectrolyte, and the CMP system can comprise one or more such positively charged polyelectrolytes. The positively charged polyelectrolyte desirably is a polymer or surfactant comprising positively charged functional groups. Typically, the positively charged polyelectrolyte comprises nitrogen-based functional groups. For example, the polyelectrolyte can be a polyamine containing primary, secondary, tertiary, or quaternary amine functional groups, or mixtures Thereof. The polyelectrolyte can be a cationic surfactant with a hydrophilic (nitrogen-containing) head group and a hydrophobic tail group. The polyelectrolyte preferably comprises one or more repeating units comprising functional groups selected from the group consisting of amines, amides, imides, imines, alkylamines, and aminoalcohols. The polyelectrolyte can be a polymer or copolymer containing only the repeating units recited above, or can be a copolymer containing one or more of those repeating units in combination with other (preferably nonionic) repeating units, for example, ethylene oxide, propylene oxide, styrene, vinyl acetate, and mixtures thereof. Nonionic repeating units can be present in the positively charged polyelectrolyte to Introduce a spatial relationship between the complexing repeating units. The number of nonionic repeating units present in the polyelectrolyte desirably does not exceed 99% (e.g., 95%) of the total number of repeating units. Preferably, the number of nonionic repeating units present in the polyelectrolyte does not exceed 90% (e.g., 85%). The polyelectrolyte also can be a copolymer containing the repeating units recited above in combination with other repeating units comprising functional groups including, for example, alcohols, phosphonic acids, phosphonates, sulfates, sulfonic acids, sulfonates, phosphates, carboxylic acids, carboxylates, and mixtures thereof. The polyelectrolyte can be a homopolymer, random copolymer, alternating copolymer, periodic copolymer, block copolymer (e.g., AB, ABA, ABC, etc.), graft copolymer, or comb copolymer.

The incorporation of nonionic or other repeating units containing functional groups with cationic nitrogen-containing repeating units allows for CMP performance optimization. Interactions of the positively charged polyelectrolyte with the abrasive particle surface, substrate surface, polishing pad surface, and liquid carrier can all be modified and optimized through variation of the types and relative amounts of repeating units. Suitable polyelectrolytes include polyethylenimines, polyaminoamides, poly(diallyldimethylammonium chloride), poly(dimethylamine-co-epichlorohydrin), poly(metlhacryloyloxyethyltrimethylammonium chloride), poly(methacryloyloxyethyldimethylbenzylammonium chloride, poly(vinylpyrrolidone), poly(vinylimidazole), poly(vinylpyridine), poly(vinylamine), a siloxane polymer or copolymer containing pendant amine groups, and combinations thereof. Preferably, the positively charged polyelectrolyte is a polyethylenimine.

In a first embodiment, the association of the positively charged polyelectrolyte with the abrasive particles results in an abrasive that is colloidally stable. Colloid refers to the suspension of abrasive particles in the liquid carrier. Colloidal stability refers to the maintenance of that suspension through time. In the context of this invention, an abrasive is considered colloidally stable if, when the abrasive is placed into a 100 ml graduated cylinder and allowed to stand unagitated for a time of 2 hours, the difference between the concentration of particles in the bottom 50 ml of the graduated cylinder ([B] in terms of g/ml) and the concentration of particles in the top 50 ml of the graduated cylinder ([T] in terms of g/ml) divided by the initial concentration of particles in the abrasive composition ([C] in terms of g/ml) is less than or equal to 0.5 (i.e., $\{[B]-[T]\}/[C] \leq 0.5$). The positively charged polyelectrolyte of the first embodiment desirably has a molecular weight of about 15,000 or more (e.g., about 20,000 or more). Typically, the positively charged polyelectrolyte has a molecular weight of about 5,000,000 or less. Preferably, the positively charged polyelectrolyte has a molecular weight of about 20,000 to about 3,000,000 (e.g., about 35,000 to about 2,000,000 or about 50,000 to about 1,000,000). Higher molecular weight polyelectrolytes (e.g., about 15,000 or more) are expected to give a thicker steric barrier around the abrasive particles than lower molecular weight (e.g., about 10,000 or less) polyelectrolytes. At very high molecular weights (e.g., MW of about 3,000,000 or more, e.g. about 2,000,000 or more), the colloidal stability of the abrasive may decrease.

In a second embodiment, the positively charged polyelectrolyte desirably has a molecular weight of about 15,000 or more (e.g., about 20,000 or more) and about 2,000,000 or less. Preferably, the positively charged polyelectrolyte has a molecular weight of about 20,000 to about 1,500,000 (e.g., about 50,000 to about 1,000,000).

When the abrasive present in the CMP systems and is suspended in the liquid carrier (i.e., when the abrasive is a component of the polishing composition), any suitable amount of abrasive can be present in the polishing composition. Typically, about 0.01 wt. % or more (e.g., about 0.05 wt. % or more) abrasive particles will be present in the polishing composition. More typically, about 0.1 wt. % or more abrasive particles will be present in the polishing composition. The amount of abrasive particles in the polishing composition typically will not exceed about 20 wt. %, more typically will not exceed about 10 wt. % (e.g., will not exceed about 5wt. %). Preferably, the amount of abrasive particles in the polishing composition is about 0.05 wt. % to about 8 wt. %, more preferably about 0.1 wt. % to about 5 wt. %, most preferably about 0.5 wt. % to about 3 wt. %.

A liquid carrier is used to facilitate the application of the abrasive (when present and suspended in the liquid carrier) and positively charged polyelectrolyte(s) or salts thereof, and any optional additives to the surface of a suitable substrate to be polished or planarized. The liquid carrier is typically an aqueous carrier and can be water alone, can comprise water and a suitable water-miscible solvent, or can be an emulsion. Suitable water-miscible solvents include alcohols such as methanol, ethanol, etc. Preferably, the aqueous carrier consists of water, more preferably deionized water.

The pH of the CMP systems described herein is maintained in a range suitable for its intended end-use. The pH used in the CMP systems is dependent on several factors including (i) the pKa of the polyelectrolyte (when the polyelectrolyte is a nitrogen-containing polymer or surfactant), (ii) the zeta potential of the abrasive particles, and (iii) the type of substrate to be polished. The cationic nature of a nitrogen-containing polyelectrolyte is a pH dependent property. To ensure that the polyelectrolyte sufficiently coats (e.g., adsorbs) onto the abrasive particles, the pH desirably is adjusted such that about 5% or more of all the functional groups of the polyelectrolyte are positively charged. This means that the pH of the CMP system desirably is at least about 1 unit lower than the pKa of about 5% or more of all the functional groups of the polyelectrolyte. In addition, the abrasive particles should have a negative zeta potential at the pH of the CMP system. Thus, the pH should be maintained at a value that is above the isoelectric point (the pH at which the zeta potential is zero) of the abrasive particles.

When the CMP systems are used in conjunction with polishing a copper-containing substrate, the pH is desirably about 7 or less, preferably, about 3 to about 6, and more preferably about 3.5 to about 5 (e.g., the pH is about 4). When the CMP systems are used to polish a platinum-containing substrate, the pH is desirably about 2 to about 7. When the CMP systems are used to polish a ruthenium-containing substrate, the pH is desirably about 5 or more, preferably about 7 to about 11. When the CMP systems are used to polish an iridium-containing substrate, the pH is desirably about 5 to about 12, preferably about 7 to about 9.

The CMP systems optionally further comprise an oxidizing agent. The oxidizing agent can be any suitable oxidizing agent. Suitable oxidizing agents include inorganic and organic per-compounds, bromates, nitrates, chlorates, chromates, iodates, iron and copper salts (e.g., nitrates, sulfates, EDTA, and citrates), rare earth and transition metal oxides (e.g., osmium tetraoxide), potassium ferricyanide, potassium dichromate, iodic acid, and the like. A per-compound (as defined by Hawley's Condensed Chemical Dictionary) is a compound containing at least one peroxy group (—O—O—) or a compound containing an element in its highest oxidation state. Examples of compounds containing at least one peroxy group include-but are not limited to hydrogen peroxide and its adducts such as urea hydrogen peroxide and percarbonates, organic peroxides such as benzoyl peroxide, peracetic acid, and di-tert-butyl peroxide, monopersulfates ($SO_5^{2-}$), dipersulfates ($S_2O_8^{2-}$), and sodium peroxide. Examples of compounds containing an element in its highest oxidation state include but are not limited to periodic acid, periodate salts, perbromic acid, perbromate salts, perchloric acid, perchlorate salts, perboric acid, perborate salts, and permanganates. The oxidizing agent preferably is hydrogen peroxide.

The CMP systems optionally further comprise a corrosion inhibitor (i.e., a film-forming agent). The corrosion inhibitor can be any suitable corrosion inhibitor. Typically, the corrosion inhibitor is an organic compound containing a heteroatom-containing functional group. For example, the film-forming agent is a heterocyclic organic compound with at least one 5- or 6-member heterocyclic ring as the active functional group, wherein the heterocyclic ring contains at least one nitrogen atom, for example, an azole compound. Preferably, the film-forming agent is a triazole, more preferably, 1,2,4-triazole, 1,2,3-triazole, or benzotriazole.

The CMP systems optionally further comprise a non-ionic surfactant. An example of a suitable nonionic surfactant is Tetronic® surfactant, commercially available from BASF Corporation.

The CMP systems optionally further comprise a chelating or complexing agent. The complexing agent is any suitable chemical additive that enhances the removal rate of the substrate layer being removed. Suitable chelating or complexing agents can include, for example, carbonyl compounds (e.g., acetylacetonates, and the like), simple carboxylates (e.g., acetates, aryl carboxylates, and the like), carboxylates containing one or more hydroxyl groups (e.g., glycolates, lactates, gluconates, gallic acid and salts thereof, and the like), di-, tri-, and poly-carboxylates (e.g., oxalates, phthalates, citrates, succinates, tartrates, malates, edetates (e.g., dipotassium EDTA), mixtures thereof, and the like), carboxylates containing one or more sulfonic and/or phosphonic groups, and the like. Suitable chelating or complexing agents also can include, for example, di-, tri-, or poly-alcohols (e.g., ethylene glycol, pyrocatechol, pyrogallol, tannic acid, and the like) and amine-containing compounds (e.g., ammonia, amino acids, amino alcohols, di-, tri-, and polyamines, and the like). Preferably, the complexing agent is a carboxylate salt, more preferably an oxalate salt. The choice of chelating or complexing agent will depend on the type of substrate layer being removed.

It will be appreciated that many of the aforementioned compounds can exist in the form of a salt (e.g., a metal salt, an ammonium salt, or the like), an acid, or as a partial salt. For example, citrates include citric acid, as well as mono-, di-, and tri-salts thereof; phthalates include phthalic acid, as well as mono-salts (e.g., potassium hydrogen phthalate) and di-salts thereof; perchlorates include the corresponding acid (i.e., perchloric-acid), as well as salts thereof. Furthermore, certain compounds or reagents may perform more than one function. For example, some compounds can function both as a chelating agent and an oxidizing agent (e.g., certain ferric nitrates and the like).

The CMP systems described herein can be used to polish (e.g., planarize) a substrate. The method of polishing a substrate comprises (i) providing the chemical-mechanical polishing system, (ii) contacting the substrate with the chemical-mechanical polishing system, and (iii) abrading at least a portion of the substrate to polish the substrate. The chemical-mechanical polishing system desirably is used in a method of polishing a substrate comprising at least one metal layer and optionally an insulating layer, whereby the substrate is contacted with the chemical-mechanical polishing system and at least a portion of the metal layer or insulating layer (if present) of the substrate is abraded such that the metal layer or insulating layer becomes polished. The substrate can be any suitable substrate (e.g., an integrated circuit, memory or rigid disks, metals, ILD layers, semiconductors, micro-electro-mechanical systems, ferroelectrics, magnetic heads, polymeric films, and low and high dielectric constant films) and can contain any suitable insulating, metal, or metal alloy layer (e.g., metal conductive layer). The insulating layer can be a metal oxide, porous metal oxide, glass, organic polymer, fluorinated organic polymer, or any other suitable high or low-κ insulating layer. The insulating layer preferably comprises silicon oxide, silicon nitride, silicon oxynitride, silicon carbide, aluminum oxide, or a material with a dielectric constant of about 3.5 or less. The metal layer preferably comprises copper, tungsten, titanium, aluminum, tantalum, platinum, ruthenium (e.g., ruthenium dioxide), rhodium, iridium (e.g., iridium dioxide), nickel, iron or cobalt.

The CMP systems of the invention are capable of polishing (e.g., planarizing) a substrate at a relatively high rate, with desirable planarization efficiency, uniformity, removal rate, and selectivity exhibited during the polishing the substrate. In particular, the CMP systems desirably are capable of polishing a substrate with a reduction in defectivity. Abrasives comprising particles coated with positively charged polyelectrolytes offer (a) reduced agglomeration of the particles, (b) altered mechanical and chemical properties of the particles, and (c) altered zeta potential of the particles, which can lead to a reduction in the number of surface defects on the substrate being polished. Abrasives comprising particles coated with positively charged polyelectrolytes also can provide an improvement in selectivity between substrate layers. For example, abrasive particles coated with amine-containing polyelectrolytes can have reduced removal rates for insulating layers as compared to uncoated abrasive particles.

The following examples further illustrate the invention but, of course, should not be construed as in any way limiting its scope.

EXAMPLE 1

This example illustrates a method for producing polyelectrolyte-coated abrasive particles that exhibit colloidal stability in accordance with the invention.

A solution of poly(dimethylamine-co-epichlorohydrin-co-ethylenediamine) (50 wt. %, MW~75,000) was dissolved in deionized water, pH adjusted with concentrated sulfuric acid, so that after silica addition the final pH was 4.5. The mixture was then blended at 20,000 rpm. A suspension of colloidal silica particles (50 wt. %, 120 nm, zeta potential of −15 to −20 mV at pH 4.5) was added to the mixture, during blending, slowly over the course of 6 minutes. The mixture was blended for another 1 minute producing a final composition comprising 12 wt. % silica and 2.5 wt. % polyelectrolyte. The resulting polyelectrolyte-coated silica particles had a mean particle size of about 132 nm. The zeta potential was measured to be +28 mV at a pH of 4.5.

The polyelectrolyte-coated silica particles were mixed with positively charged alumina particles (Composition 1A, invention). Similar untreated silica particles were also mixed with positively charged alumina particles (Composition 1B, control). Upon mixing, the polyelectrolyte-coated abrasive composition (1A) remained colloidally stable, unlike the untreated abrasive composition (1B), which flocculated and settled.

This example demonstrates that polyelectrolyte-coated abrasive particles can easily be produced and stored for later use in a chemical-mechanical polishing process. The example also demonstrates that polyelectrolyte coated particles can overcome stability problems encountered with untreated abrasives.

EXAMPLE 2

This example illustrates that polyelectrolyte-coated abrasive particles do not agglomerate over time.

A dispersion of fumed silica (5 wt. %, zeta potential of about −20 mV at pH 7, 156 nm) was treated with a solution of 0.625 wt. % polyethylenimine in deionized water at pH of 7. The mixture was subjected to high shear for 20 min producing a colloidally stable composition having a zeta potential of about +15 mV at pH of 7. The resulting abrasive composition had a mean particle size of 158 nm. After 27 days, the mean particle size was 167 nm.

This example demonstrates that positively charged polyelectrolyte-coated abrasive particles are highly stable.

EXAMPLE 3

This example demonstrates that abrasive particles having a positive zeta potential can be charge reversed upon contact with a charge-reversing agent and coated with a positively charged polyelectrolyte to produce stable polyelectrolyte-coated abrasive particle dispersions.

A dispersion of fumed alumina (3 wt. %, zeta potential=+30 to +40 mV at pH 6) was mixed with tartaric acid (1.25 wt. %). The resulting dispersion of abrasive particles had a zeta potential of −15 mV at pH 7, thereby demonstrating that an abrasive having a positive zeta potential can be charge reversed by contacting the abrasive with a charge-reversing agent.

Another dispersion of the same type of fumed alumina (3 wt. %, zeta potential=+30 to +40 mV at pH 6) was similarly treated with an aqueous solution comprising tartaric acid (100 ppm) and polyethylenimine (0.125 wt. %) and subjected to high shear for 20 min. The resulting dispersion of polyethylenimine-coated alumina particles was stable for over 4 months.

This example demonstrates that abrasive particles having a positive zeta potential are useful in the invention provided that the abrasive particles are treated with a charge-reversing agent. Such abrasive particles can be coated with positively charged polyelectrolytes and demonstrate good resistance to flocculation and settling over time.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A chemical-mechanical polishing system comprising:
   (a) an abrasive,
   (b) water, and
   (c) a positively charged polyelectrolyte with a molecular weight of about 15,000 or more and about 2,000,000 or less, wherein the positively-charged polyelectrolyte is a polymer or surfactant comprising positively-charged functional groups, wherein the positively-charged functional groups are selected from the group consisting of primary amines, secondary amines, tertiary amines, quaternary amines, and combinations thereof, and wherein either (1) the positively-charged polyelectrolyte further comprises (i) repeating units comprising functional groups selected from the group consisting of phosphonic acids, phosphonates, sulfates, sulfonic acids, sulfonates, phosphates, carboxylic acids, carboxylates, and mixtures thereof, (ii) repeating units selected from the group consisting of ethylene oxide, propylene oxide, vinyl acetate, and mixtures thereof, or (iii) one or more repeating units comprising functional groups selected from the group consisting of amides, imides, and mixtures thereof, or (2) the positively charged polyelectrolyte is a siloxane polymer or copolymer containing pendant amine groups;
   wherein the abrasive comprises particles that are electrostatically associated with the positively charged polyelectrolyte, and wherein the particles that are electrostatically associated with the positively charged polyelectrolyte have a negative zeta potential and are obtained by treating particles having a positive zeta potential with a charge-reversing agent.

2. The chemical-mechanical polishing system of claim 1, wherein the particles are silica or alumina.

3. The chemical-mechanical polishing system of claim 2, wherein about 5% or more of all the functional groups of the positively charged polyelectrolyte are positively charged.

4. A method of polishing a substrate comprising contacting a substrate with the chemical-mechanical polishing system of claim 2 and abrading at least a portion of the substrate to polish the substrate.

5. The method of claim 4, wherein the substrate comprises a metallic layer comprising copper, tungsten, titanium, aluminum, tantalum, platinum, ruthenium, rhodium, iridium, nickel, iron, or cobalt.

6. The method of claim 4, wherein the substrate comprises an insulating layer comprising silicon oxide, silicon nitride, silicon oxynitride, silicon carbide, aluminum oxide, or a material with a dielectric constant of about 3.5 or less.

7. The chemical-mechanical polishing system of claim 2, wherein the abrasive is present in the chemical-mechanical polishing system in an amount of about 0.05 wt. % to about 8 wt. %.

8. The chemical-mechanical polishing system of claim 2, wherein the chemical-mechanical polishing system further comprises an oxidizing agent.

9. The chemical-mechanical polishing system of claim 2, wherein the chemical-mechanical polishing system further comprises a corrosion inhibitor.

10. The chemical-mechanical polishing system of claim 2, wherein the particles are silica.

11. The chemical-mechanical polishing system of claim 2, wherein the particles are alumina.

12. The method of claim 5, wherein the substrate comprises copper, and the chemical-mechanical polishing system has a pH of about 7 or less.

13. The method of claim 12, wherein the chemical-mechanical polishing system has a pH of about 3 to about 6.

14. The method of claim 5, wherein the substrate comprises platinum, and the chemical-mechanical polishing system has a pH of about 2 to about 7.

15. The method of claim 5, wherein the substrate comprises ruthenium, and the chemical-mechanical polishing system has a pH of about 5 or more.

16. The method of claim 15, wherein the chemical-mechanical polishing system has a pH of about 7 to about 11.

17. The method of claim 5, wherein the substrate comprises iridium, and the chemical-mechanical polishing system has a pH of about 5 to about 12.

18. The method of claim 17, wherein the chemical-mechanical polishing system has a pH of about 7 to about 9.

* * * * *